(12) United States Patent
Kim

(10) Patent No.: US 8,321,633 B2
(45) Date of Patent: Nov. 27, 2012

(54) MEMORY CARD AND METHOD FOR STORING DATA ON MEMORY CARD

(75) Inventor: Kyong-Ae Kim, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 386 days.

(21) Appl. No.: 11/833,585

(22) Filed: Aug. 3, 2007

(65) Prior Publication Data

US 2008/0034159 A1 Feb. 7, 2008

(30) Foreign Application Priority Data

Aug. 4, 2006 (KR) ........................ 10-2006-0073862

(51) Int. Cl.
*G06F 12/00* (2006.01)

(52) U.S. Cl. ............ 711/138; 711/103; 710/26; 710/27; 710/38

(58) Field of Classification Search .................. 711/115, 711/138–139, 203, 213; 710/22–28
See application file for complete search history.

(56) References Cited

U.S. PATENT DOCUMENTS

| | | | | |
|---|---|---|---|---|
| 5,093,915 | A * | 3/1992 | Platteter et al. ................... 713/2 |
| 5,530,673 | A * | 6/1996 | Tobita et al. ............. 365/185.09 |
| 5,737,145 | A * | 4/1998 | Jung ........................... 360/77.08 |
| 6,151,441 | A * | 11/2000 | Kawamura et al. ............. 386/95 |
| 6,219,693 | B1 * | 4/2001 | Napolitano et al. ........... 709/203 |
| 6,421,274 | B1 | 7/2002 | Yoshimura |
| 6,725,321 | B1 * | 4/2004 | Sinclair et al. ................. 711/103 |
| 6,775,721 | B1 * | 8/2004 | Tran ................................. 710/52 |
| 2002/0085497 | A1 * | 7/2002 | Phillips et al. ............. 370/235.1 |
| 2005/0091458 | A1 * | 4/2005 | Sato et al. ...................... 711/138 |
| 2005/0135156 | A1 * | 6/2005 | Vogel ........................ 365/185.28 |
| 2005/0144367 | A1 * | 6/2005 | Sinclair .......................... 711/103 |
| 2006/0039659 | A1 | 2/2006 | Bocanegra et al. |
| 2006/0136655 | A1 * | 6/2006 | Gorobets et al. .............. 711/103 |
| 2007/0033378 | A1 * | 2/2007 | Sinclair et al. ................. 711/203 |
| 2007/0127876 | A1 | 6/2007 | Bocanegra et al. |
| 2008/0183949 | A1 * | 7/2008 | Ly et al. ......................... 711/103 |

FOREIGN PATENT DOCUMENTS

| | | |
|---|---|---|
| JP | 7244992 A | 9/1995 |
| JP | 11-1765311 | 7/1999 |
| JP | 2001-344981 | 12/2001 |
| JP | 2002288034 A | 10/2002 |
| JP | 2005066770 A | 3/2005 |
| JP | 2006043492 A | 2/2006 |
| JP | 2006058892 A | 3/2006 |
| KR | 1996-0018948 | 6/1996 |
| KR | 10-0222908 | 7/1999 |
| KR | 1020020020104 A | 3/2002 |
| KR | 10-2006-0055518 | 5/2006 |
| KR | 1020060053780 A | 12/2007 |

* cited by examiner

*Primary Examiner* — Brian Peugh
*Assistant Examiner* — Nicholas Simonetti
(74) *Attorney, Agent, or Firm* — Volentine & Whitt, PLLC

(57) ABSTRACT

A memory card, connected to a host, includes a NAND flash memory and a memory controller. The NAND flash memory includes multiple pages, and each page includes multiple sectors. The memory controller receives sector data and a corresponding sector address from the host. The memory controller enables the sector data to be transferred to the NAND flash memory over a first data bus, via a buffer memory, when the sector address is an address for accessing a first sector in a selected page. The memory controller enables the sector data to be transferred to the NAND flash memory over a second data bus, bypassing the buffer memory, when the sector address is an address for accessing a sector other than the first sector in the selected page.

14 Claims, 3 Drawing Sheets

MEMORY CARD AND METHOD FOR STORING DATA ON MEMORY CARD

CROSS-REFERENCE TO RELATED APPLICATIONS

A claim of priority is made to Korean Patent Application No. 10-2006-0073862, filed on Aug. 4, 2006, the subject mater of which is hereby incorporated by reference.

BACKGROUND OF THE INVENTION

1. Field of the Invention

The present invention relates to a memory card, and more particularly, to a memory card having a flash memory and a method of storing data on the memory card.

2. Description of the Related Art

A memory card, may be used as an auxiliary memory for a digital device, such as a digital camera or a mobile phone. Examples of memory cards include compact flash (CF) cards, smart media (SM) cards, memory sticks, multimedia cards (MMC), microdrivers, an extreme digital (xD) picture cards and secure digital (SD) cards.

Memory cards are small in size, convenient to use and have high data transfer rates. For example, the xD picture card is a next-generation flash memory card that has been developed to address various size and capacity limitations of the SM cards. The xD picture card has dimensions of 20×25×1.7 mm, making it the smallest of the memory cards. The xD picture card is called "extreme digital" memory card because its storage capacity can be up to 8 GB (gigabytes).

The xD picture card is connected to a host (e.g., a digital camera) through an interface scheme for a NAND flash memory. The xD picture card can be smaller in size and increased in data storage capacity, as compared to other memory cards, such as a CF card, an SD card, a memory stick and an MMC, that use NAND flash memories.

In general, a memory card may include a NAND flash memory and a memory controller. The NAND flash memory stores data provided from a host. For example, when the host is a digital camera, still pictures are stored in the NAND flash memory. When the host is a camcorder, moving pictures are stored in the NAND flash memory. The memory controller controls overall operation of the memory card. Under the control of the memory controller, the data provided from the host are transferred to the NAND flash memory and the data stored in the NAND flash memory are output to the host.

The data storage time of the memory card is divided into the data transfer time from the host to the NAND flash memory and the program time of the NAND flash memory. The data transfer time is defined as the time taken for the memory controller to transfer data from the host to the NAND flash memory in response to a write request of the host. The program time of the NAND flash memory is defined as the time taken to program data, which have been transferred to the NAND flash memory, into a memory cell array of the NAND flash memory.

The reduction of the program time of the NAND flash memory is limited without fundamental changes in the NAND flash memory. However, it is possible to reduce the data transfer time from the host to the NAND flash memory in order to reduce the overall data storage time of the memory card.

SUMMARY OF THE INVENTION

An aspect of the present invention provides a memory card configured to connect to a host. The memory card includes a NAND flash memory and a memory controller. The NAND flash memory includes multiple pages, each of which includes multiple sectors. The memory controller receives sector data in sector units and a corresponding sector address from the host, and transfers the sector data to the NAND flash memory directly or via a buffer memory, depending on the sector address. The memory controller may include a first data bus for transferring the sector data via the buffer memory, and a second data bus for transferring the sector data directly to the NAND flash memory. The memory controller may enable the first data bus when the sector address is an address for accessing a first sector in a selected page, and the second data bus when the sector address is an address for accessing a sector other than a first sector in a selected page.

The memory controller may further include a control unit for enabling the first data bus or the second data bus in response to the sector address. The control unit may include an address register for storing a defined sector address; a selector for comparing the sector address and the defined sector address and for selecting one of the first data bus and the second data bus based on the comparison; and a direct memory access (DMA) controller for interrupting a central processing unit (CPU) and controlling the first data bus and the second data bus. Each page may have a capacity of 2 KB and each sector may have a capacity of 512 B. The buffer memory may be a dual port memory, such as a static random access memory (SRAM) or a dynamic random access memory (DRAM).

Another aspect of the present invention provides a method of storing data in a memory card, including a NAND flash memory and a memory controller, where the NAND memory includes multiple pages and each page includes multiple sectors, and where the memory controller receives data from a host in sector units and transfers sector data to the NAND flash memory. The method includes receiving a write command and a sector address from the host, and transferring sector data corresponding to the sector address to the NAND flash memory, directly or via a buffer memory, according to the write command and the sector address. The transferred sector data are stored as page data in a selected page of the NAND flash memory.

The memory controller may include a first data bus for transferring data via the buffer memory and a second data bus for transferring data directly to the NAND flash memory. The method thus may further include enabling the first data bus for transferring of the sector data to the NAND flash memory when the sector address includes a first sector address for accessing a first sector in the selected page. Also, the second data bus may be enabled for transferring the sector data to the NAND flash memory when the sector address comprises a sector address, other than the first sector address, for accessing a sector other than the first sector in the selected page. When the sector address includes the first sector address and a write operation on another page is in progress, the write operation may be completed on the other page.

Yet another aspect of the present invention provides a memory card that includes a NAND flash memory having multiple pages, each page having multiple sectors, and a memory controller for receiving sector data and a corresponding sector address from a host. The memory controller enables the sector data to be transferred to the NAND flash memory over a first data bus, via a buffer memory, when the sector address is an address for accessing a first sector in a selected page. The memory controller enables the sector data to be transferred to the NAND flash memory over a second data bus, bypassing the buffer memory, when the sector address is an address for accessing a sector other than the first sector in the selected page.

BRIEF DESCRIPTION OF THE FIGURES

The embodiments of the present invention will be described with reference to the attached drawings, in which.

DETAILED DESCRIPTION OF THE EMBODIMENTS

Figure 1:
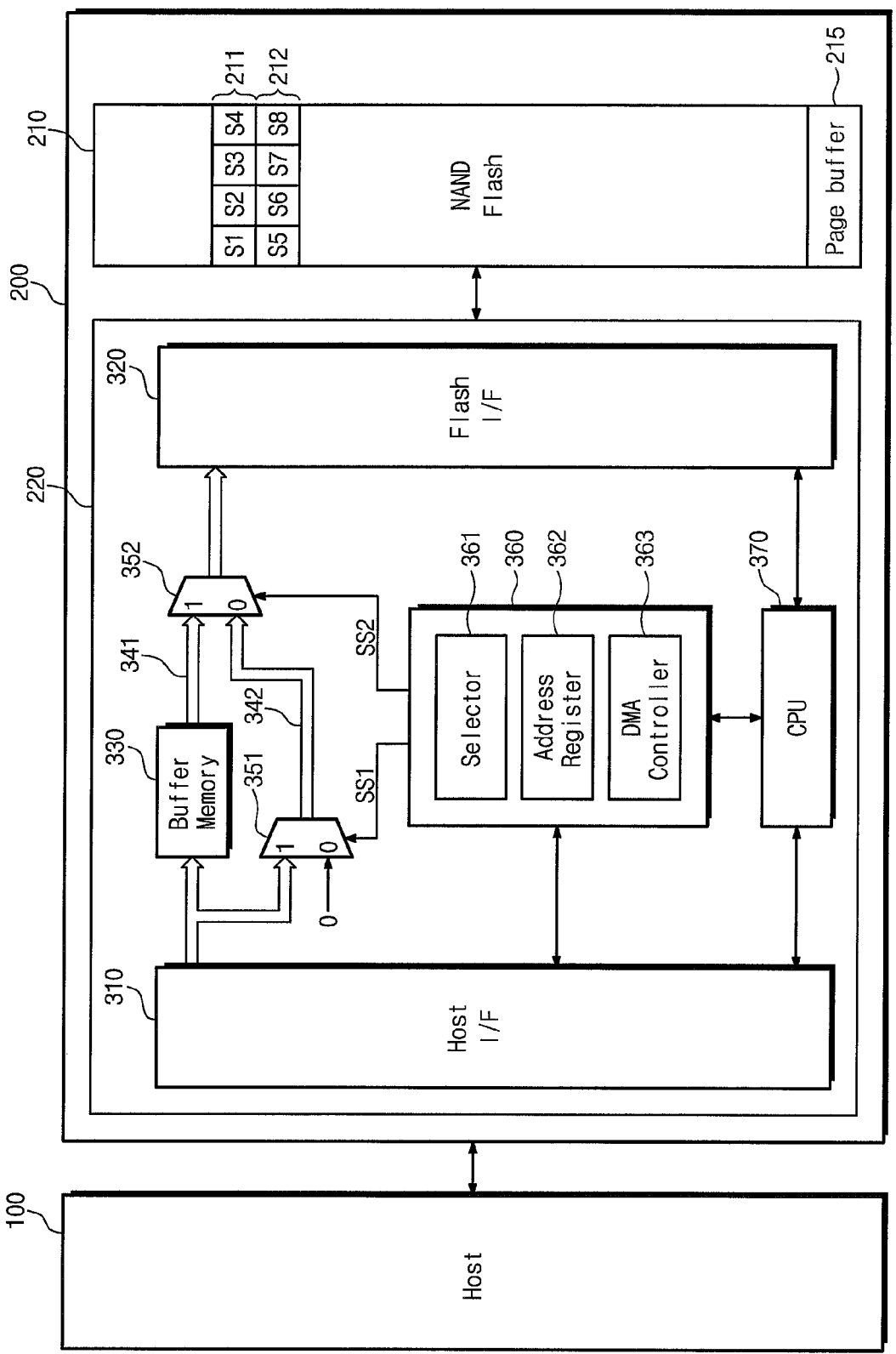
FIG. 1 is a block diagram illustrating a memory card, according to an exemplary embodiment of the present invention.

The present invention will now be described more fully with reference to the accompanying drawings, in which exemplary embodiments of the invention are shown. The invention, however, may be embodied in various different forms, and should not be construed as being limited only to the illustrated embodiments. Rather, these embodiments are provided as examples, to convey the concept of the invention to one skilled in the art. Accordingly, known processes, elements, and techniques are not described with respect to some of the embodiments of the present invention. Throughout the drawings and written description, like reference numerals will be used to refer to like or similar elements. Also, throughout the drawings and written description, the terms of "write" and "program" have the same meaning.

FIG. 1 is a block diagram of a memory card, according to an exemplary embodiment of the present invention.

Referring to FIG. 1, a memory card 200 is connected to a host 100. The host 100 may be any electronic device capable of being used in connection with the memory card 200. Examples of the host 100 include a digital camera, an MP3 player, a PDA, a mobile phone and a computer. The memory card 200 includes a NAND flash memory 210 and a memory controller 220.

The NAND flash memory 210 includes a memory cell array (not pictured) and a page buffer 215. The page buffer 215 temporarily stores data to be programmed to or read from a page (e.g., page 211).

The memory cell array includes multiple memory blocks, each of which includes multiple pages (e.g., pages 211 and 212). Each of the pages includes multiple sectors (e.g., sectors S1-S4 and S5-S8), each of which includes multiple memory cells (not pictured). An erase operation is performed in memory block units, and a read/write operation is performed page units. In other words, data of one memory block are simultaneously erased, and data of one page are simultaneously read or programmed.

In general, data of 16 KB (kilobytes) or 128 KB are stored in one memory block, and data of 512 B (bytes) or 2 KB are stored in one page, depending on the size of a memory block. A NAND flash memory can be classified into a small-block memory and a large-block memory. Table 1 illustrates the main differences between the small-block memory and the large-block memory.

TABLE 1

| | Small-Block Memory | Large-Block Memory |
|---|---|---|
| Block Size | 16 KB | 128 KB |
| Unit of Writing (except spare) | 512 B | 2 KB |
| Unit of Reading (except spare) | 512 B | 2 KB |
| Unit of Erasing (except spare) | 16 KB | 128 KB |

Referring to Table 1, the small-block memory has a 16 KB block size and the large-block memory has a 128 KB block size. The small-block memory performs a read/write operation in units of 512 B page (except a spare area), and an erase operation in units of 16 KB block (except a spare area). The large-block memory performs a read/write operation in units of 2 KB page (except a spare area), and an erase operation in units of 128 KB block (except a spare area).

The NAND flash memory 210 illustrated in FIG. 1 is a large-block memory. As an example, two pages 211 and 212 are illustrated in the NAND flash memory 210 of FIG. 1. Each of the pages stores 2 KB of data. The first page 211 includes first to fourth sectors S1 to S4, and the second page 212 includes fifth to eighth sectors S5 to S8. Each of these sectors stores 512 B of data.

The memory controller 220 includes a host interface 310, a flash interface 320, a buffer memory 330, a control unit 360, a central processing unit (CPU) 370, a first data bus 341, and a second data bus 342. The data buses 341 and 342 may be dual or single data buses, although for purposes of explaining the depicted embodiment, it is assumed that the data buses 341 and 342 are dual data buses.

The first data bus 341 transfers data via the buffer memory 330. On the other hand, the second data bus 342 transfers data from the host 100 to the NAND flash memory 210 directly, not via the buffer memory 330. According to the present embodiment, the memory card 200 can increase a program speed using the dual data buses 341 and 342.

The host interface 310 includes a command conversion circuit (not pictured) and an address conversion circuit (not pictured). The command conversion circuit receives an external command and generates a corresponding internal command to be provided to the NAND flash memory 210. Likewise, the address conversion circuit receives an external address and generates a corresponding internal address. The internal command and the internal address are transferred to the flash interface 320 via a bus (not pictured).

In addition, the host interface 310 receives data from the host 100. The received data are transferred to the buffer memory 330 and/or are transferred to the flash interface 320 directly, i.e., not via the buffer memory 330. The host interface 310 receives the data in sector units (e.g., 512 B). The memory card 200 according to the present embodiment can be efficiently used when data are received from the host 100 in sector units (e.g., 512 B) and data are programmed in page units (e.g., 2 KB).

The flash interface 320 provides an internal command, an internal address, an internal control signal and data to the NAND flash memory 210. The data provided to the NAND flash memory 210 are data that are transferred from the host interface 310, either though the buffer memory 330 or directly, via the first and second data buses 341 and 342, respectively.

The buffer memory 330 temporarily stores data that are received from the host interface 310. The data stored in the buffer memory 330 may be transferred to the flash interface 320 via the first data bus 341. The buffer memory 330 can perform a buffer operation. For example, the buffer memory 330 can output data to the flash interface 320 in sector units or page units while receiving data from the host interface 310 in sector units. The buffer memory 330 may be implemented using a dual port, random access memory (RAM), such as a static RAM (SRAM) and a dynamic RAM (DRAM).

As stated above, the memory controller 220 includes the second data bus 342 in addition to the first data bus 341. The first and second data buses 341 and 342 are selected by first and second multiplexers 351 and 352. The first multiplexer 351 transfers data to the second data bus 342 in response to a first selection signal SS1 from the control unit 360. For example, when the first selection signal SS1 is logic "1", data are transferred to the second data bus 342. On the other hand, when the first selection signal SS1 is logic "0", the data transfer to the second data bus 342 is interrupted. The second multiplexer 352 transfers data of the second data bus 342 to the flash interface 320 in response to a second selection signal SS2 from the control unit 360. For example, when the second selection signal SS2 is logic "1", data are transferred to the flash interface 320 from the buffer memory 330 via the first data bus 341. On the other hand, when the second selection signal SS2 is logic "0", data are transferred via the second data bus 342.

The control unit 360 operates in response to an external command, an external address and a control signal received from the host interface 310. Referring to FIG. 1, the controller unit 360 includes a selector 361, an address register 362 and a DMA controller 363.

The selector 361 compares a sector address defined in the address register 362 with a present sector address, which has been newly input, to select one of the first data bus 341 or the second data bus 342. For example, when the defined sector address is different from the present sector address, the selector 361 selects the first data bus 341. In this case, data are transferred to the flash interface 320 via the buffer memory 330. On the other hand, when the defined sector address is the same as the present sector address, the selector 361 selects the second data bus 342. In this case, data are transferred from the host interface 310 to the flash interface 320 directly, bypassing the buffer memory 330.

The address register 362 receives the present sector address, and stores the defined sector address that will be input next. For example, it is assumed that, initially, the present sector address is an address designating the first sector S1 of the page 221 in the NAND flash memory 210. In this case, the address register 362 receives a first sector address, and stores an address, referred to as a second sector address (e.g., designating the second sector S2 of page 211), as the defined sector address. When the address register 362 then receives an input second sector address as the present sector address, the selector 361 compares the present sector address with the defined sector address previously stored in the address register 362, and generates a first selection signal SS1 or a second selection signal SS2, depending on whether the present sector address matches the defined sector address.

The DMA controller 363 controls the data buses using a direct memory access (DMA) scheme. During a DMA transfer mode, the CPU 370 cannot control the data bus and becomes idle. In response to a DMA request from the host interface 310, the DMA controller 363 activates a bus request (BR) signal to prevent the CPU 370 from controlling the data bus. That is, during the DMA transfer mode, data are transferred via the data bus 341 or the second data bus 342, without the intervention of the CPU 370.

The memory card 200 illustrated in FIG. 1 can be efficiently used for a system that receives data in sector units and stores data in page units. The memory card 200 includes the buffer memory 330 that performs a data I/O operation in sector units. The memory card 200 includes an indirect data transfer path for transferring data from the host 100 to the NAND flash memory 210 via the buffer memory 330, and a direct data transfer path for transferring data from the host 100 directly to the NAND flash memory 210. In the memory card 200, sector data to be stored in the first sector of a page are transferred via the buffer memory 330, but sector data to be stored in any of the remaining sectors of the page are transferred directly, bypassing the buffer memory 330. Accordingly, the memory card 200 provides a higher data storage speed than a conventional memory card.

Figure 2:
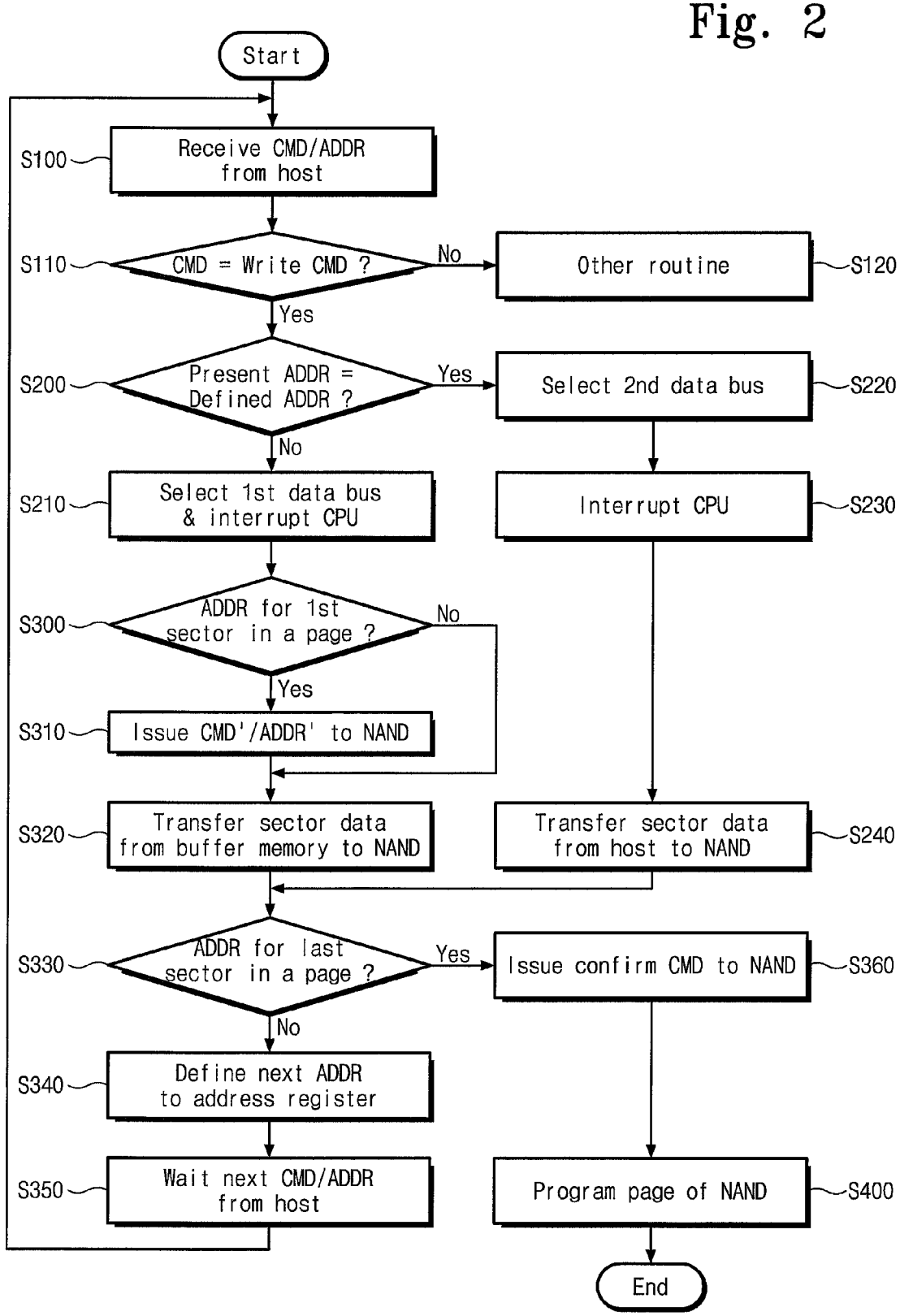
FIG. 2 is a flowchart illustrating a program operation of the memory card illustrated in FIG. 1, according to an exemplary embodiment of the present invention.

FIG. 2 is a flowchart illustrating an operation of the exemplary memory card 200, illustrated in FIG. 1.

Referring to FIGS. 1 and 2, an external command CMD and an external address ADDR are issued from the host 100 to the memory card 200. When the memory card 200 is connected to the host 100, the host interface 310 receives the external command CMD and the external address ADDR from the host 100 in step S100. The external address ADDR is a sector address for accessing a sector (e.g., S1 of page 211) of the NAND flash memory 210.

In step S110, the host interface 310 determines whether the external command CMD is a write command. When the external command CMD is not a write command, another routine (e.g., a read command or an erase command) is performed as indicated by step S120. For example, when the external command CMD is a read command, as opposed to a write command, a read operation is performed in step S120. When the external command CMD is a write command, the operation of the memory card 200 proceeds to step S200.

In step S200, the control unit 360 determines whether the received external address ADDR, also referred to as the present sector address (present ADDR), is the same as a defined sector address (defined ADDR), defined in the address register 362. Generally, when the present ADDR is not identical to the defined ADDR, the data is transferred through the first data bus 341, and when the present ADDR is the same as the defined ADDR, the data is transferred through the second data bus 342, as discussed in more detail below.

Referring to FIG. 2, when the present ADDR is the same as the defined ADDR, the process proceeds to step S220. In step S220, the selector 361 generates the first selection signal SS1 of logic "1" and the second selection signal SS2 of logic "0" to select the second data bus 342. In step S230, the DMA controller 363 interrupts the CPU 370 to control the second data bus 342. In step S240, the sector data received from the host 100 are transferred through the second data bus 342 directly to the NAND flash memory 210, bypassing the buffer memory 330.

On the other hand, when it is determined at step S200 that the present ADDR (i.e., the input external address ADDR) is not the same as the defined ADDR, the process proceeds to step S210. In step 210, the selector 361 generates the first selection signal SS1 of logic "0" and the second selection signal SS2 of logic "1" to select the first data bus 341. Also, the DMA controller 363 may interrupt the CPU 370 to control the first data bus 341.

In step S300, the CPU 370 determines whether the present ADDR is a first sector address ADDR1, corresponding to the first sector S1 in the page 211 of the NAND flash memory 210. In general, the first sector S1 in the page 211 is typically accessed first. However, when the host 100 supports a random sector write scheme, for example, another sector (e.g., S3) in the page 211 may be first accessed. For purposes of discussion, it is assumed that the first sector S1 is first accessed, although it is understood that the order in which pages and/or sectors are accessed may vary without departing from the spirit and scope of the present invention.

When it is determined that the present ADDR is the first sector address ADDR1 (in step S300), an internal command CMD' and an internal address ADDR' are provided to the NAND flash memory 210 through the flash interface 320 in step S310. The internal command CMD' and the internal address ADDR' are internally converted from the external command CMD and the external address ADDR, respectively, to be compatible with the NAND flash memory 210.

In step 320, the sector data stored in the buffer memory 330 are transferred through the first data bus 341 to the NAND flash memory 210. The sector data are the data received from the host 100. When the present ADDR is the first sector address ADDR1, the sector data are stored in the first sector S1 via the page buffer 215.

On the other hand, when the present ADDR is not the first sector address ADDR1 (as determined in step S300), the sector data are transferred from the buffer memory 330 to the NAND flash memory 210 through the first data bus 341 in step S320, without performing step S310. In this case, the internal command CMD' and the internal address ADDR' had previously been transferred to the NAND flash memory 210.

In step S330, the CPU 370 determines whether the present ADDR is to access the last sector in the page 211, e.g., the fourth sector S4. As stated above, the last accessed sector may not necessarily be the fourth sector S4 sector, for example, when a random sector write scheme is used, in which case another sector (e.g., S2) in the page 211 may be last accessed. For purposes of discussion, it is assumed that the fourth sector S4 is last accessed, although it is understood that the order in which pages and/or sectors are accessed may vary without departing from the spirit and scope of the present invention.

When the present ADDR is not the fourth sector address ADDR4 (e.g., the last sector address) for accessing the fourth sector S4, a next sector address is stored in the address register 362 in step S340 as the defined sector address (e.g., the defined ADDR) under the control of the CPU 370. For example, when the present ADDR is the first sector address ADDR1, the second sector address ADDR2 for accessing the second sector S2 is stored in the address register 362 as the defined sector address. Likewise, when the present ADDR is the second sector address ADDR2, the third sector address ADDR3 for accessing the third sector S3 is stored in the address register 362 as the defined sector address.

In step S350, the memory card 200 waits for the next external command and address from the host 100. When the next external command and address are received from the host 100, for example, at step S100, the process again performs at least steps S110 to S330.

When it is determined at step S330 that the present ADDR is the fourth sector address ADDR4 (e.g., the last sector address), the CPU 370 issues a confirm command to the NAND flash memory 210 through the flash interface 320 in step S360. In general, a program operation of the NAND flash memory 210 is performed when the last sector, data of a page are stored in the page buffer 215. In step S400, the NAND flash memory 210 simultaneously programs data stored in the page buffer 215 into the selected page 211, for example, once it receives the fourth sector S4 data. It is understood, however, that the program operation of the NAND flash memory 210 with respect to the operation of the page buffer 215 may vary without departing from the spirit and scope of the present invention.

Figure 3:
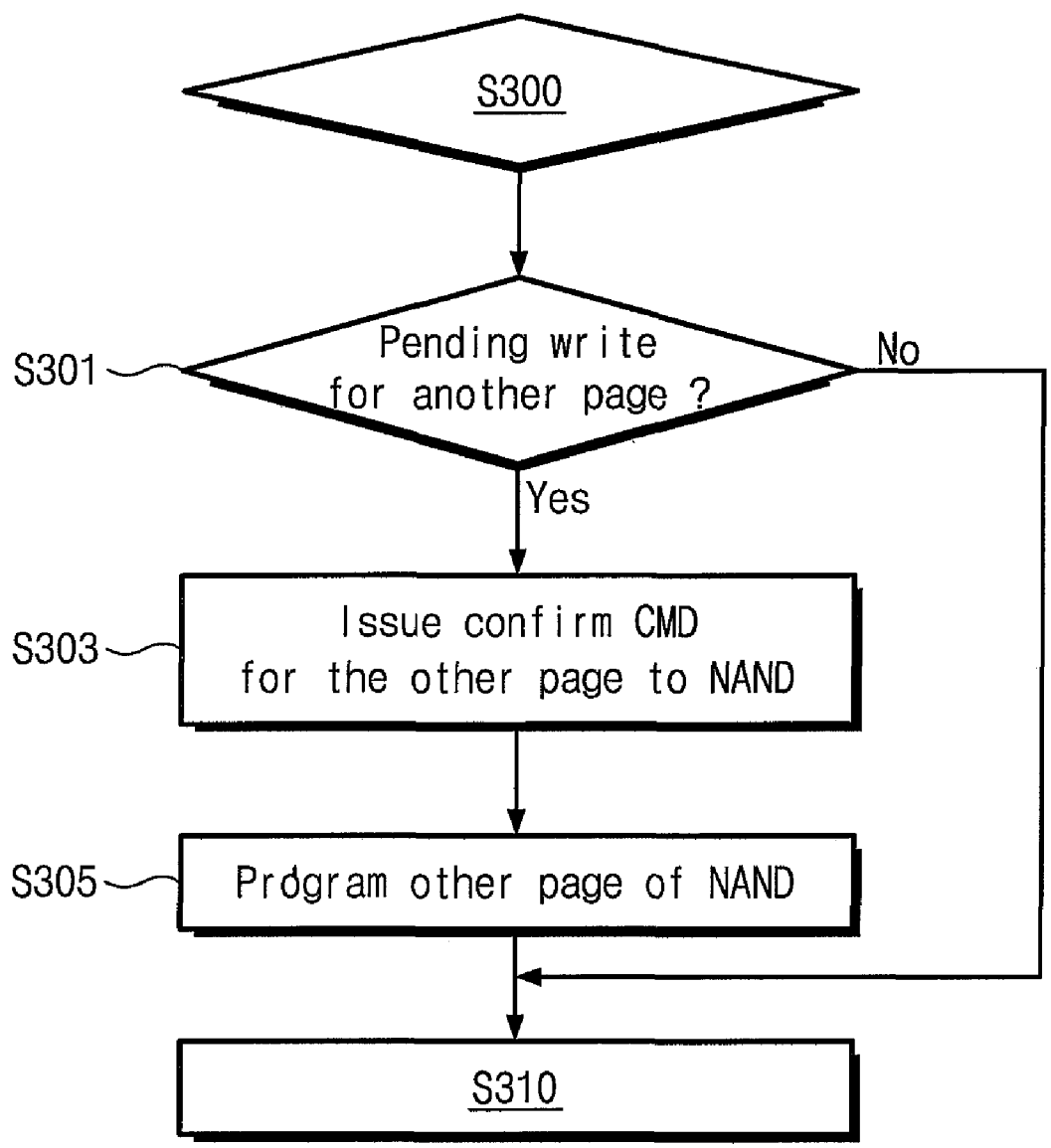
FIG. 3 is a flowchart illustrating an additional aspect of the program operation illustrated in FIG. 2, according to an exemplary embodiment of the present invention.

FIG. 3 is a flowchart illustrating a program operation that may be further performed between step S300 and step S310 of FIG. 2. The program operation in FIG. 3 can be efficiently used when the host 100 supports an alternative write scheme, such as a random sector write scheme.

Referring to FIG. 3, in step S301, the CPU 370 determines whether a write operation is being performed on a page other than the selected page. When a write operation is not being performed on another page, the operation continues with step S310 as described above with respect to FIG. 2.

When a write operation is being performed on another page, a confirm command is issued to the NAND flash memory 210 in step S303. An example of this situation is when a write operation is being performed on the first page 211 in the state where the fifth sector address ADDR5 for accessing the fifth sector S5 in the second page 212 is input. When a write operation is performed on the first page 211 in step S301, for example, the confirm command is issued to the NAND flash memory 210 in step S303. In step S305, the NAND flash memory 210 simultaneously programs data stored in the page buffer 215 in the other page, e.g., page 211. Thereafter, step S310 is performed, continuing the process as described above with respect to FIG. 2.

The memory card according to the present embodiment receives data from the host in sector units and stores data in page units. The memory card transfers data for the first sector of a page of the flash memory via the buffer memory, and transfers data for the remaining sectors directly. Accordingly, the memory card is able to provide a higher data storage speed than a conventional memory card.

As described above, the memory card has not only a data transfer path for transferring data from the host to the NAND flash memory via a buffer memory, but also an additional data transfer path for transferring data from the host directly to the NAND flash memory. The additional direct data transfer path enables a higher data storage speed than the conventional memory card.

While the present invention has been described with reference to exemplary embodiments, it will be apparent to those skilled in the art that various changes and modifications may be made without departing from the spirit and scope of the present invention. Therefore, it should be understood that the above embodiments are not limiting, but illustrative.

What is claimed is:

1. A memory card configured to connect to a host, the memory card comprising:
    a NAND flash memory comprising a plurality of pages, each page comprising a plurality of sectors; and
    a memory controller for receiving sector data in sector units and a corresponding sector address from the host, and for transferring the sector data to the NAND flash memory directly or via a buffer memory, depending on the sector address,
    wherein the memory controller transfers the sector data to the NAND flash memory via the buffer memory when the sector address is an address for accessing a first sector in a selected page of the NAND flash memory, and
    wherein the memory controller transfers the sector data directly to the NAND flash memory when the sector address is an address for accessing a sector other than a first sector in the selected page.

2. The memory card of claim 1, wherein the memory controller comprises:
    a first data bus for transferring the sector data via the buffer memory; and
    a second data bus for transferring the sector data to the NAND flash memory without buffering via the buffer memory.

3. The memory card of claim 2, wherein the memory controller further comprises:

a control unit for enabling one of the first data bus and the second data bus in response to the sector address.

4. The memory card of claim 3, wherein the control unit comprises:
an address register for storing a defined sector address, wherein the defined sector address corresponds to a next sector address relative to a previous sector address of a previous stored sector;
a selector for comparing the sector address and the defined sector address, and for selecting one of the first data bus and the second data bus based on the comparison; and
a direct memory access (DMA) controller for interrupting a central processing unit (CPU) and controlling the first data bus and the second data bus.

5. The memory card of claim 1, wherein each page has a size of 2 KB and each sector has a size of 512 B.

6. The memory card of claim 1, wherein the buffer memory comprises a dual port memory.

7. The memory card of claim 6, wherein the buffer memory comprises a static random access memory (SRAM).

8. The memory card of claim 6, wherein the buffer memory comprises a dynamic random access memory (DRAM).

9. A method of storing data in a memory card, comprising a NAND flash memory and a memory controller, the NAND memory comprising a plurality of pages and each page of the plurality of pages comprising a plurality of sectors, and the memory controller receiving data from a host in sector units and transferring sector data to the NAND flash memory, the method comprising:
receiving a first write command and a first sector address from the host, the first sector address identifying a sector location of a selected page of the NAND memory;
transferring first sector data, corresponding to the first sector address, to the NAND flash memory according to the write command and the sector address;
setting a defined sector address which corresponds to a next sector location of the page of the NAND memory;
receiving a next write command and a next sector address from the host;
transferring next sector data, corresponding to the next sector address, directly to the NAND flash memory when the next sector address matches the defined sector address; and
transferring the next sector data, corresponding to the next sector address, to the NAND flash memory via a buffer memory when the next sector address does not match the defined sector address.

10. The method of claim 9, wherein the memory controller comprises a first data bus for transferring data via the buffer memory and a second data bus for transferring data directly to the NAND flash memory, the method further comprising:
enabling the first data bus for transferring of the sector data to the NAND flash memory when the sector address comprises a first sector address for accessing a first sector in the selected page.

11. The method of claim 10, further comprising:
enabling the second data bus for transferring the sector data to the NAND flash memory when the sector address comprises a sector address, other than the first sector address, for accessing a sector other than the first sector in the selected page.

12. The method of claim 10, further comprising:
when the sector address comprises the first sector address and a write operation on another page is in progress, completing the write operation on the other page.

13. The method of claim 9, wherein each sector has a size of 512 B and each page has a size of 2 KB.

14. A memory card, comprising:
a NAND flash memory comprising a plurality of pages, each page comprising a plurality of sectors; and
a memory controller for receiving sector data and a corresponding sector address from a host, the memory controller enabling the sector data to be transferred to the NAND flash memory over a first data bus, via a buffer memory, when the sector address is an address for accessing a first sector in a selected page, and the memory controller enabling the sector data to be transferred to the NAND flash memory over a second data bus, bypassing the buffer memory, when the sector address is an address for accessing a sector other than the first sector in the selected page,
wherein the memory controller compares the sector address and a defined sector address to be received next from the host, and determines whether the sector data is transferred over the first data bus or the second data bus based on the comparison between the sector address and the defined sector address.

* * * * *